March 7, 1933. J. L. CREVELING 1,900,277
ELECTRIC REGULATION
Original Filed March 7, 1917
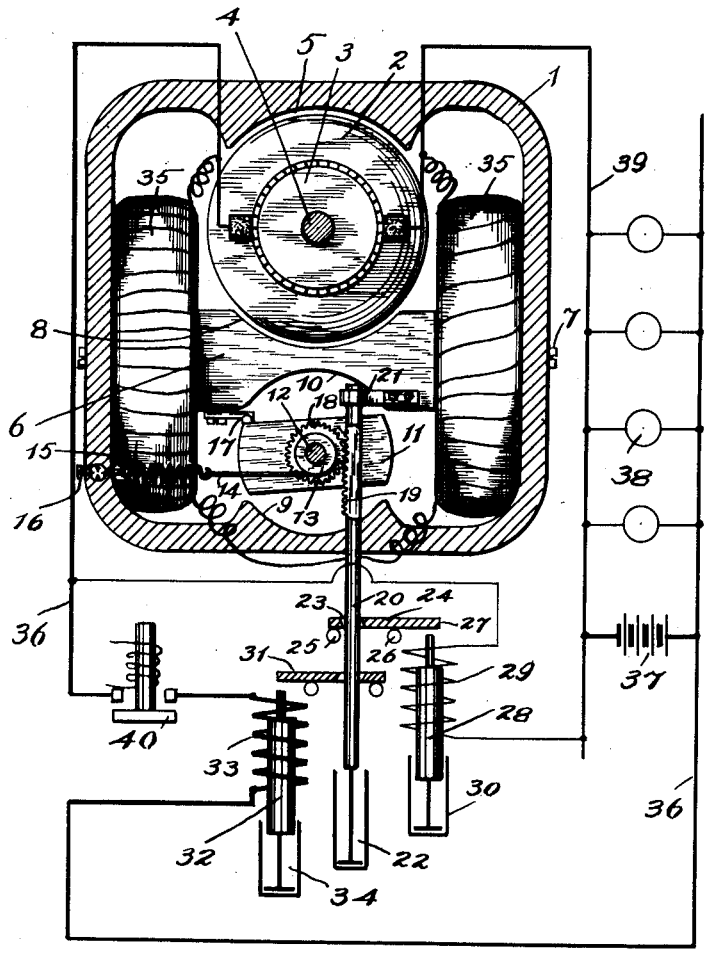
Fig. I.
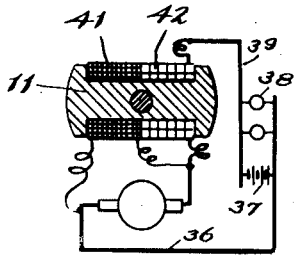
Fig. II.
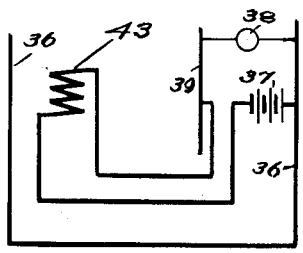
Fig. III.
INVENTOR.

Patented Mar. 7, 1933                                              1,900,277

UNITED STATES PATENT OFFICE

JOHN L. CREVELING, OF WHITE PLAINS, NEW YORK, ASSIGNOR, BY MESNE ASSIGN-
MENTS, TO SIMPLEX EQUIPMENT COMPANY, INC., OF NEW YORK, N. Y., A CORPO-
RATION OF DELAWARE

ELECTRIC REGULATION

Application filed March 7, 1917. Serial No. 153,122.

My invention pertains to that class of electric regulation wherein it is desired to regulate a dynamo electric machine, and has for a particular object to provide means whereby the same may be automatically regulated.

A further object of my invention is to provide means whereby a dynamo will be automatically regulated with respect to a plurality of functions, as for example the voltage across some circuit or circuits supplied by a dynamo operating as a generator, and the current in some circuit or circuits supplied by a dynamo when thus acting.

A further object of my invention is to produce such means wherein the regulation in response to one function will not interfere with the regulation in response to another function when such regulation is in a direction desired. But, if the regulation in response to one function tend to interfere with a predetermined operation of the generator so as to affect some other function to a predetermined limit, the regulation will be usurped by means responsive to the last named function and the dynamo will at all times be regulated in such manner as to carry out a predetermined method of operation when used under certain conditions contemplated in my invention, as for example in a system wherein a plurality of variables may each affect the dynamo in such manner that any one will so regulate the same as to prevent it exceeding a predetermined limit of a particular variable.

As my invention is particularly applicable to systems of electrical distribution wherein a dynamo driven at widely varying speeds is used to charge a storage battery and operate lamps or other translating devices in conjunction therewith, and wherein it is desired to automatically regulate the dynamo so as to properly charge the storage battery and maintain the translating devices, it will be described with particular reference to such a system, for the purpose of illustration.

In the drawing, Fig. I is a diagrammatic representation of such a system embodying my invention;

Fig. II shows a modification which may be made in the system of Fig. I; and

Fig. III indicates a modification that may be made in the system indicated generally in Fig. I.

In Fig. I there is shown a dynamo serving as a generator, provided with a shell or frame 1, an armature 2 having a suitable commutator 3, and carried by the shaft 4 in any suitable type of bearing members, not shown. A portion of the shell 1 is so shaped as to form a pole piece 5 in operative relation to the armature 2, while a member 6, fitted tightly into the frame 1 and secured therein as by screws 7, is so shaped as to form a pole piece 8 in operative relation to the armature 2. The lower portion of the frame 1 is so shaped as to provide a pole piece 9, while a portion of the member 6 is so shaped as to form a corresponding pole piece 10 between which may be revolved a shunting member 11 of iron or other magnetic material supported as by the shaft 12 in suitable bearings, not shown. Upon the shaft 12 there is mounted a sheave or drum 13 engaging the band 14 attached to the spring 15 which is adjustable as by the screw 16, the arrangement being such that the spring 15 tends to rotate the member 11 in a clockwise direction, while its movement in such direction is limited by the stop 17, preferably of brass or other non-magnetic material. The shaft 12 also carries a pinion 18 which engages the rack 19 carried by the rod 20 which may be provided with any suitable guiding means, as indicated at one end in the form of member 21, and at the other end in the form of a suitable dash-pot 22. The rod 20 passes through an opening 23 in the member 24, so shaped that when the member 24 rests upon the members or stops 25 and 26 the rod 20 passes freely through the opening 23. But, if the member 24 be canted, as for example by lifting its extremity 27, the member 24 will grip the rod 20 at the opening 23 in such manner that if the end 27 of the member 24 be raised it will raise the rod 20 and cause the same to revolve the pinion 18 through the instrumentality of the rack 19, so as to rotate the member 11 in a counter-clockwise direction against the tension of spring 15,— while too sudden movement will be restrained by the action of dashpot 22. 28 is a core of iron or other magnetic material which may be held in position in any desired manner within the coil or solenoid 29, which when energized tends to raise the core 28 into contact with the extremity 27 of the member 24 and cause the said member 24 to engage the rod 20 in such manner that if core 28 be then further raised it will cause the member 11 to be rotated in a counter-clockwise direction. Too sudden movement of the core 28 is resisted as by dashpot 30. 31 represents a clutching member similar to the member 24 which engages the rod 12 in a similar manner when 31 is raised by raising the core 32, which is similar to the core 28 and surrounded by a coil 33 tending when excited to raise the core 32 in such manner as to revolve the member 11 in a counter-clockwise direction, while too sudden movement of the core 32 is prevented by means of dashpot 34.

The dynamo is provided with a suitable field exciting means, in this instance indicated as the shunt coils 35 surrounding the member 6 and tending when energized to set up a magnetic field for the armature and also a leakage field through member 11. That is, the magnetic lines set up by the field exciting coils 35 may flow from the pole piece 8 through armature 2, pole piece 5 and frame 1 to the member 6, and also from the member 6 through magnetic shunt member 11, pole piece 9 and frame 1 to the member 6. And it will be obvious that the percentage of the total lines set up by coils 35 which will be shunted away from the armature or generating flux may be controlled by the position of the member 11, which when in the position shown in the drawing may form a path of high magnetic reluctance and shunt away but comparatively few lines from the armature; while by properly dimensioning the member 11 with respect to its pole pieces it may, if revolved through approximately 90° from the position shown in the figure, shunt away a great portion of the lines set up by the coils 35. Therefore, the generator may be regulated by properly manipulating the member 11 through the instrumentality of the rod 20, the position of which may be controlled by either core 28 or core 32 and their cooperating solenoids.

As the system chosen for illustration in Fig. I is one wherein the generator current and generator voltage are both desired to be held from exceeding a predetermined limit, I have placed the solenoid 33 in series with the positive generator lead 36, carried to the positive terminals of the storage battery 37 and lamps or translating devices 38, the negative terminals of which are connected with the lead 39, and I have shown the coil 29 as in shunt across the generator mains 36 and 39. A switch 40 is placed in the lead 36 to prevent the battery from discharging back through the generator when the voltage of the latter falls below that of the battery. This switch is preferably one of the automatic variety adapted to close its circuit when the generator voltage is substantially equal or slightly in excess of that of the battery and to open its circuit when the generator voltage is substantially equal or very slightly below that of the battery, in such manner as to prevent back discharge. And as such switches are well known in the art and the particular type chosen forms no part of my present invention, the mere presence of such a switch is indicated and details of construction are purposely omitted for the sake of clearness, it being understood that any suitable type of such switch may be used.

In Fig. II the member 11ᵃ is shown in section and is provided with a voltage winding indicated at 41 and a current winding indicated at 42, either or both of which may be used for the purpose of polarizing the member 11ᵃ, for a purpose as will hereinafter more plainly appear.

In Fig. III there is shown a coil or solenoid 43 which is in series with the battery circuit and therefore responsive to the battery circuit current, as differentiated from the main generator current.

An operation of my invention, referring particularly to Fig. I, is as follows:

If the generator be at rest or running at sufficiently low speed, the switch 40 will be open and the parts of the system will be in the positions shown in the drawing, and the lamps or translating devices 38 may be supplied by the battery 37 in the usual manner. If the generator speed be brought to that point at which its voltage is slightly in excess of that of the battery, switch 40 will be automatically closed and current will flow from the generator through lead 36, switch 40, solenoid 33 and lead 36 to the battery and translating devices 38, from which return is made through lead 39. The tendency of magnetic lines to leak from pole piece 10 to pole piece 9 through the member 11 will tend to rotate the said member in a counterclockwise direction so as to increase the number of lines passing therethrough and thus weaken the useful flux through the armature. And I so adjust the spring 15 as by means of the screw 16 that when the generator is substantially at or below the desired voltage to be held across the generator the member 11 will be held against the stop 17, in the position shown in the drawing, wherein it will shunt away from the armature the least amount of the useful magnetic flux. And it will be obvious that if the generator voltage increase slightly, the magnetic lines set up by the coils 35 will increase, and their tendency to rotate the member 11 into such position as to shunt away a greater portion of the armature flux will also increase, and the member 11 will therefore have a tendency toward rotating into such position as to automatically hold the generator voltage constant after reaching a predetermined value determined by the spring 15, and might alone provide a more or less coarse type of voltage regulation for the generator. However, my invention comprehends a more delicately responsive regulation, and I therefore adjust the spring 15 so that when the maximum desired voltage is across the generator circuit the torque, as above described, upon the member 11 is almost sufficient to revolve the same into regulating position. And I so adjust the core 28 with respect to the solenoid 29, in any desired manner, that an extremely small increase above this predetermined desired voltage will raise the core 28 into contact with the extremity 27 of the member 24, and by raising the extremity 27 will cant the member 24 into such position as to grip the rod 20 and raise the same and rotate the member 11 in a counter-clockwise direction, and by shunting away more of the useful flux counter-act any appreciable increase in voltage across the circuit bridged by the solenoid 29. If the generator voltage tends to fall, a reverse operation will take place tending to restore the same to the normal, and it will be obvious that in this manner I cause the regulating mechanism to respond to very delicate fluctuations and may thereby hold the voltage of the generator substantially constant throughout wide speed changes above a predetermined limit.

In practice, I ordinarily choose the voltage to be held constant by the solenoid 29 as the maximum value necessary to give the battery 37 a full charge. Therefore, as the battery 37 becomes charged and its voltage approaches this value, the current therethrough will naturally taper off and approach zero in a desirable manner. If at any time while the generator is operating at a voltage insufficient to cause the core 28 to affect the rod 20 through its clutch member 24 the generator current tends to increase above a predetermined maximum value, the solenoid 33 will lift the core 32 so as to swing its cooperating member 31 into such position as to clutch the rod 20, and then by raising the said rod, swing the member 11 into such position that it will shunt away sufficient lines from the generating flux to cut down the generator voltage enough to prevent this desired maximum current from being exceeded. And it will be noted that when either the current responsive means or the voltage responsive means is operating to regulate the generator, and the other means is inoperative, the rod 20 may pass freely through the clutch member forming part of the then inoperative means, and that if at any time one of the responsive means be regulating the generator and the maximum value of the quantity regulated by the other means is reached, the said last named means will come into action and usurp the function of regulation of the generator, and, by lowering the value of the quantity upon which the operation of the remaining means is dependent, cause the same to go out of action until a value of its respective responsive quantity is reached, which will cause it to usurp the function of regulating the generator, and in a similar manner put the other means out of action.

The member 11 in Fig. I may be of any desired section and is illustrated merely as a magnetic body preferably of iron or mild steel having low magnetic reluctance; while in Fig. II the member 11ª is shown as provided with a shunt or voltage responsive polarizing coil 41 which may be used to cause the member 11ª to have a greater torque, and therefore delicately responsive to voltage fluctuations, whereby it may be made to respond more accurately in step with the voltage responsive means governed by the coil 29, which is desirable under some circumstances. The member 11ª in Fig. II is also shown as provided with a series winding 42 which may be in series with the main circuit, as shown, and in series with any other circuit the current within which it is desired to have affect or modify the polarization of said member 11ª. For example the coil 43 of Fig. III, which is in series with the battery circuit and responsive to the current in that circuit only, may be wound so as to affect the core 11ª instead of the coil 42 of Fig. II.

It will be obvious that either a plain voltage winding, as shown at 41, or a plain current winding, as shown at 42, may be used alone, if desirable, or both may be employed, if so chosen. Further, it will be plain that the polarizing winding or windings may either be wound upon the member 11ª in a manner similar to the old type of shuttle armature, or arranged in any suitable manner. Further, it will be obvious that the current responsive coil 33 in the main circuit of Fig. I may be suppressed, and there may be substituted therefor a current responsive coil 43 of Fig. III, which is shown in the battery circuit, with which arrangement the core 32 will be so operated that the current in the battery circuit will be held from exceeding a predetermined limit, instead of the main generator current.

From the foregoing it wil be obvious that I have produced an improvement in electrical regulation wherein the dynamo may be very delicately regulated in response to both voltage and current fluctuations by the manipulation of a comon regulating means, and which in turn tends to respond in such manner as to enhance the delicacy of the responsive means performing the true regulation of the system. And I have also produced a system wherein any desired number of variables dependent upon the operation of the generator may be held from exceeding a predetermined limit. For it will be obvious that any number of clutching devices as shown at 24 and 31 may be arranged with proper responsive means similar to the voltage and current responsive means affecting said clutching members of Fig. I, and that such means may be made responsive to current or voltage in any desired number of circuits, and when their respective maximum value is reached will take hold and perform the regulation of the generator in such manner as to prevent such maximum from being exceeded. Further, it will be obvious that while I have described the operation of my invention with respect to a dynamo serving as a generator, it is not limited to such use, but refers to the regulation of a dynamo electric machine when operating either as a generator or motor.

While the structures here shown disclose a generator regulator affected by voltage fluctuations and means for affecting the regulator which comes into action only while the regulator is relatively ineffective, this feature is not here claimed, as the same is covered in my co-pending application, 383,750, filed May 24, 1920.

I do not wish in any way to limit myself to any of the exact constructions or details of operation given above to illustrate an embodiment of my invention, for it will be obvious that wide departure may be made therein without departing from the spirit and scope thereof.

What I claim is:

1. In a dynamo electric machine, regulating means comprehending a movable magnetic shunt combined with clutch mechanism for moving said shunt and responsive means for affecting said clutch mechanism.

2. In a dynamo electric machine, regulating means comprehending a movable magnetic shunt and clutch mechanism affecting the same operated in response to electrical fluctuations in a circuit supplied by the dynamo.

3. In a dynamo electric machine, regulating means comprehending a movable magnetic shunt and a plurality of independent clutching means for affecting said shunt.

4. In a dynamo electric machine, regulating means comprehending a movable magnetic shunt and a plurality of clutching means for affecting said shunt combined with clutch operating means responsive to electrical fluctuations.

5. In a dynamo electric machine, regulating means comprehending a movable magnetic shunt and a plurality of clutching means for affecting said shunt combined with clutch operating means responsive to current and voltage fluctuations.

6. In a dynamo electric machine, regulating means comprehending a movable magnetic shunt and a plurality of clutching means for affecting said shunt combined with clutch operating means independently responsive to current and voltage fluctuations.

7. In a dynamo electric machine, regulating means comprehending a movable magnetic shunt, and clutching means combined with means whereby the same is independently affected by a plurality of functions of said machine for mechanically affecting said shunt.

8. In a dynamo electric machine, an armature and field exciting means, means for shunting a portion of the magnetic field away from the armature, electromagnetic means responsive to a plurality of functions dependent upon the operation of said dynamo, and clutching means whereby movement of said responsive means affects the operation of the shunting means.

9. A dynamo comprehending an armature, a magnetic circuit, and means for maintaining a magnetic flux therethrough combined with movable means for diverting a portion of said flux away from the armature, voltage responsive means, current responsive means, and clutching means whereby the responsive means may affect the diverting means.

10. A dynamo comprehending an armature, a magnetic circuit and means for maintaining a magnetic flux therethrough, combined with movable means for diverting a portion of said flux away from the armature, voltage responsive means, current responsive means, and means whereby the responsive means may affect the diverting means comprehending clutch members independently affected by the responsive means.

11. A dynamo comprehending an armature, a magnetic circuit and means for maintaining a magnetic flux therethrough, combined with movable means for diverting a portion of said flux away from the armature, voltage responsive means, current responsive means, and means whereby the responsive means may affect the diverting means comprehending a movable member and clutching means affecting the same and operated by the responsive means.

12. In a dynamo, the combination of field exciting means, an armature, a magnetic circuit cooperating with said field exciting means to direct lines of force through said armature, and a movable member of magnetic material for shunting magnetic lines away from the armature and affected by the field exciting means, with means responsive to a plurality of functions of operation of the dynamo, and clutch connections cooperating mechanically to assist the field exciting means in affecting the position of the movable member.

13. In a dynamo, the combination of field exciting means, an armature, a magnetic circuit cooperating with said field exciting means to direct lines of force through said armature, and a movable member of magnetic material for shunting magnetic lines away from the armature and affected by the field exciting means, with means responsive to a plurality of functions of operation of the dynamo, and clutch connections cooperating mechanically to assist the field exciting means in affecting the position of the movable member to cause the same to regulate the dynamo independently with respect to a plurality of operating functions thereof.

14. In a dynamo, field exciting means, an armature, and a circuit of low magnetic reluctance cooperating with the field exciting means to direct magnetic lines through said armature, a movable magnetic shunt adapted to shunt magnetic lines away from said armature in variable degree depending upon the position thereof, means for affecting the position thereof, and a plurality of independently movable clutch members responsive to a plurality of functions of the dynamo cooperating therewith to regulate the dynamo.

15. In a dynamo, field exciting means, an armature, and a circuit of low magnetic reluctance cooperating with the field exciting means to direct magnetic lines through said armature, a movable magnetic shunt adapted to control the dynamo by shunting magnetic lines away from the armature and tending upon increase of field strength of the dynamo to shunt away a greater portion of said lines, a plurality of means responsive to fluctuations of operation of the dynamo including clutch connections adapted to independently cooperate to mechanically assist the field exciting means in affecting the position of the shunting means.

16. The combination with a dynamo, a storage battery and translating devices supplied thereby, and means for regulating the dynamo comprehending a magnetic shunt member the effect of which is varied by motion imparted thereto, of independent clutching means for affecting the same operated in response to current fluctuations and to voltage fluctuations depending upon the condition of the battery and the operation of the translating devices.

17. The combination with a dynamo, a storage battery and translating devices supplied thereby, and means for regulating the dynamo comprehending a magnetic shunt member the effect of which is varied by motion imparted thereto, of clutching means independently operated in response to voltage fluctuations and to current fluctuations for imparting motion thereto during the charging of the battery and supplying of the translating devices.

18. The combination with a dynamo having field exciting means, an armature and a circuit of low magnetic reluctance cooperating with the field exciting means to direct magnetic lines through said armature, a movable magnetic shunt adapted to control the dynamo by shunting magnetic lines away from the armature and tending upon increase in voltage of the dynamo to shunt away a greater portion of said lines and thereby tending to maintain the voltage substantially constant, of means responsive to voltage fluctuations affected by the operation of the generator, means responsive to current fluctuations affected by the operation of the generator, and means whereby the said responsive means may independently affect the magnetic shunt to vary the operation thereof, said last named means comprehending clutch mechanism whereby the said responsive means each independently affect the magnetic shunt in one direction regardless of the other responsive means and in an opposite direction only to an extent which may be determined by the other responsive means.

19. The combination with a dynamo and a movable means for controlling the same, of a plurality of clutches for independently gripping a portion of said controlling means, and means for separately operating said clutches responsive to different quantities affected by the operation of the dynamo.

20. The combination with a dynamo and means for controlling the same, of a plurality of clutches for affecting said controlling means, and means for operating said clutches responsive to different electrical fluctuations, the arrangement of the clutches being such that each may independently affect the regulating means in one direction and the effect produced by one clutch in another direction may depend upon the operation of another clutch.

21. The combination with a dynamo, of regulating means therefor comprehending a movable member and clutching means for engaging said member combined with clutch operating means independently responsive to current and voltage fluctuations.

22. The combination with a dynamo, of regulating means therefor comprehending a movable member the position of which affects the operation of the dynamo and clutching means for controlling the position of said member combined with clutch operating means independently responsive to fluctuations in a plurality of electrical quantities.

23. The combination with a dynamo, regulating means comprehending a movable member and a plurality of clutching means for affecting said member, of a plurality of clutch operating means each independently affecting one of the clutching means.

24. The combination with a dynamo, regulating means comprehending a movable member and a plurality of clutching means for affecting said member, of a plurality of clutch operating means each independently affecting one of the clutching means and independently responsive to current and voltage fluctuations.

25. The combination with a dynamo and regulating means therefor, of a plurality of means responsive to a plurality of functions depending upon the operation of said dynamo, a member the position of which affects the regulating means and clutching means for moving said member whereby each of said responsive means independently affects the operation of the regulating means.

26. The combination with a dynamo and regulating means therefor, of means separately responsive to a plurality of functions depending upon the operation of said dynamo, means for affecting the regulating means, and clutching means engaging the same whereby movement of said responsive means immediately affects the operation of the regulating means.

27. The combination with a generator and a battery adapted to be charged thereby, of a regulator for the generator including a shunt coil responsive to generator voltage and capable of operating to maintain substantial constancy of the generator voltage in spite of speed changes, and means operative to assist said shunt coil for more accurately establishing the generator voltage constancy to be maintained.

28. In an electric system, in combination, a variably driven generator, a battery adapted to be charged thereby, a regulator to control the generator output, and means effective when said regulator is relatively ineffective to assist in the operation of said regulator in accordance with the charging capacity of said battery.

29. In an electric system, in combination, a variably driven generator, a battery adapted to be charged thereby, an electro-responsive regulator to control the generator approximately in accordance with the relative normal state of charge of the battery, and automatic means operative to affect said regulator to establish the standard of subsequent effectiveness thereof more nearly in accordance with the actual capacity for charge of the battery.

30. In a system of electrical distribution, in combination, a variable speed generator and a battery connected to be charged thereby, means for regulating a function of the generator output approximately to a predetermined standard irrespective of the generator speed, and means operative when the generator voltage is below a predetermined value for assisting in the operation of said regulating means.

31. The combination with a variable speed generator and automatic regulating means adapted approximately to control the same as against speed changes, of electro-responsive means for affecting the action of said regulating means operative during relative ineffectiveness of said regulating means.

32. The combination with a variable speed generator, regulating means adapted to control the same and voltage-responsive means for operating said regulating means, of electro-responsive means affecting the action of said regulating means to produce more delicate regulation operating during relative ineffectiveness of said voltage-responsive means.

33. The combination with a variable speed generator and regulating means adapted to automatically control the same when a certain voltage is reached, of electro-responsive means adapted to effect more delicate operation of the regulating means and to come into action when the regulating means is relatively ineffective.

34. The combination with a variable speed generator and regulating means the operation of which affects said generator, of voltage-responsive means adapted to affect the regulating means and voltage-responsive means adapted to affect the operation of said regulating means to increase the delicacy thereof and to come into operation during relative ineffectiveness of said first named voltage-responsive means.

35. The combination with a variable speed generator, a battery charged thereby and regulating means adapted to automatically affect the operation of said generator in response to voltage fluctuations when above a certain value, of voltage-responsive means affecting the operation of said regulating means adapted to come into operation when the regulating means is relatively ineffective in the control of the generator voltage.

36. The combination with a generator and a voltage operated regulator for affecting the same, of a voltage-responsive device for affecting the operation of the regulator and a frictionally effective device for affecting the operation of the voltage-responsive device.

37. The combination with a generator and an automatic voltage operated regulator for affecting the same, of a clutching device for affecting said regulator and voltage operated means for operating said clutching device.

38. The combination with a variable speed generator and voltage-responsive regulating means for controlling the same under certain conditions of voltage fluctuations, of a frictionally acting device for affecting said regulating means and voltage-responsive means for operating said frictional device.

39. The combination with a variable speed generator, a battery charged thereby and voltage-responsive regulating means for automatically controlling the generator under certain conditions, of a frictionally affected device for affecting said regulating means, and voltage-responsive means for operating said frictional device to assist in operating the regulating means.

40. The combination with a variable speed generator, a regulating device for controlling the same and a voltage-responsive coil for controlling the operation of said device of a second voltage-responsive coil and frictional cooperating means whereby the second voltage-responsive coil affects the operation of the first named voltage-responsive coil.

41. The combination with a variable speed generator and regulating means adapted to automatically affect the same when a certain voltage is reached, of electro-responsive means adapted to affect the operation of the regulating means comprehending frictionally controlled mechanism for assisting the voltage responsive means and means for automatically operating same at a voltage below that necessary to operate the aforesaid regulating means.

42. The combination with a variable speed generator and regulating means adapted to automatically control the same when a certain voltage is reached of electro-responsive means adapted to assist in the operation of the regulating means and to come into action at a voltage below that necessary to operate the aforesaid regulating means.

43. The combination with a generator and a regulator including means capable of automatically controlling the operation of the generator if unaided, of means for assisting the said means in the normal operation of the regulator and arranged to come into action while the regulator is relatively ineffective.

44. The combination with a generator and a regulator including means capable of automatically controlling the operation of the generator if unaided, of means for assisting the said means in the normal operation of the regulator and arranged to come into action while the regulator is relatively ineffective, due to the absence of such assistance.

JOHN L. CREVELING.